US012782699B2

(12) United States Patent
Kang et al.

(10) Patent No.: US 12,782,699 B2
(45) Date of Patent: Nov. 3, 2026

(54) METHODS AND APPARATUS FOR HIGH-RESOLUTION MICROSCOPY

(71) Applicant: Arizona Board of Regents on Behalf of the University of Arizona, Tucson, AZ (US)

(72) Inventors: Dongkyun Kang, Tucson, AZ (US); Jingwei Zhao, Tucson, AZ (US); Clara Curiel, Tucson, AZ (US)

(73) Assignee: Arizona Board of Regents on Behalf of the University of Arizona, Tuscon, AZ (US)

( * ) Notice: Subject to any disclaimer, the term of this patent is extended or adjusted under 35 U.S.C. 154(b) by 490 days.

(21) Appl. No.: 18/547,743

(22) PCT Filed: Feb. 23, 2022

(86) PCT No.: PCT/US2022/017459
§ 371 (c)(1),
(2) Date: Aug. 24, 2023

(87) PCT Pub. No.: WO2022/182715
PCT Pub. Date: Sep. 1, 2022

(65) Prior Publication Data

US 2024/0126058 A1 Apr. 18, 2024

Related U.S. Application Data

(60) Provisional application No. 63/153,010, filed on Feb. 24, 2021.

(51) Int. Cl.
*G02B 21/00* (2006.01)
*G01N 21/47* (2006.01)
(Continued)

(52) U.S. Cl.
CPC ......... *G02B 21/0032* (2013.01); *G01N 21/47* (2013.01); *G02B 21/0068* (2013.01);
(Continued)

(58) Field of Classification Search
CPC ................ G02B 21/00; G02B 21/0004; G02B 21/0008; G02B 21/0012; G02B 21/0016;
(Continued)

(56) References Cited

U.S. PATENT DOCUMENTS 6,221,281 B1 * 4/2001 Motoyama ............ G02B 21/33 252/582
8,570,649 B2 10/2013 Truong et al.
(Continued)

FOREIGN PATENT DOCUMENTS

WO WO 2019/130372 * 11/2020

OTHER PUBLICATIONS

Freeman Esther E., et al., "Smartphone confocal microscopy for imaging cellular structures in human skin in vivo," Biomed Opt Express. 2018;9(4):1906-15.
(Continued)

*Primary Examiner* — Thong Q Nguyen
(74) *Attorney, Agent, or Firm* — ASHURST PERKINS COIE US LLP

(57) ABSTRACT

Devices, systems and methods are described that enable formation of microscopic images with enhanced resolution and high specificity, which among other features and benefits can lead to increased diagnostic accuracy of skin diseases, and decrease the time needed for rendering a diagnosis and the time required for training medical personnel. One optical imaging device includes a condenser, a polarizing beam splitter, an objective lens, and an immersion medium that are arranged in a configuration that allows cross polarization imaging of a sample. The described
(Continued)

devices can be implemented using inexpensive optoelectrical components, as well as using existing optical and processing components of commonly used mobile devices, which makes it possible to construct the microscopy devices and systems at low cost for use in a wide range of clinical settings.

15 Claims, 17 Drawing Sheets

(51) Int. Cl.

| | |
|---|---|
| ***G02B 21/04*** | (2006.01) |
| ***G02B 21/06*** | (2006.01) |
| ***G02B 21/08*** | (2006.01) |
| ***G02B 21/24*** | (2006.01) |
| ***G02B 21/26*** | (2006.01) |
| ***G02B 21/36*** | (2006.01) |
| *G01N 21/17* | (2006.01) |

(52) U.S. Cl.
CPC .......... *G02B 21/008* (2013.01); *G02B 21/04* (2013.01); *G02B 21/06* (2013.01); *G02B 21/08* (2013.01); *G02B 21/241* (2013.01); *G02B 21/26* (2013.01); *G02B 21/361* (2013.01); *G01N 2021/1765* (2013.01); *G01N 2021/4792* (2013.01); *G01N 2201/0635* (2013.01); *G01N 2201/0636* (2013.01); *G01N 2201/0638* (2013.01); *G01N 2201/0683* (2013.01)

(58) Field of Classification Search
CPC ............ G02B 21/002; G02B 21/0024; G02B 21/0028; G02B 21/0032; G02B 21/0052; G02B 21/0056; G02B 21/006; G02B 21/0068; G02B 21/008; G02B 21/0092; G02B 21/02; G02B 21/06; G02B 21/08; G02B 21/082; G02B 21/14; G02B 21/241; G02B 21/26; G02B 21/33; G02B 21/361
USPC .......................................... 359/368–398
See application file for complete search history.

(56) References Cited

U.S. PATENT DOCUMENTS

| | | | | |
|---|---|---|---|---|
| 9,687,152 | B2 | 6/2017 | Zeng et al. | |
| 9,726,872 | B2 | 8/2017 | Huang et al. | |
| 9,733,460 | B2 | 8/2017 | Kang et al. | |
| 10,406,248 | B2 | 9/2019 | Morse et al. | |
| 2014/0285881 | A1* | 9/2014 | Iketaki .............. | G02B 21/0056 359/385 |
| 2015/0109623 | A1 | 4/2015 | Abdulhalm et al. | |
| 2016/0040978 | A1 | 2/2016 | Boppart et al. | |
| 2017/0176338 | A1 | 6/2017 | Wu et al. | |
| 2017/0241766 | A1 | 8/2017 | Arieli et al. | |
| 2018/0199863 | A1 | 7/2018 | Stewart et al. | |
| 2020/0025677 | A1 | 1/2020 | Prater et al. | |
| 2020/0026050 | A1 | 1/2020 | Wicker et al. | |

OTHER PUBLICATIONS

International Search Report and Written Opinion mailed Jun. 10, 2022 for PCT/US22/17459.

Yaroslavsky, Anna N., et al., "Dual-Wavelength Optical Polarization Imaging for Detecting Skin Cancer Margins," Journal of Investigative Dermatology, vol. 140, Issue 10, 2020, pp. 1994-2000.

Gareau Daniel S., et al., "Line-scanning reflectance confocal microscopy of human skin: comparison of full-pupil and divided-pupil configurations," Optics letters. 2009;34(20):3235-7. PMCID: 2774830.

Gong, Cheng, et al., "Low-cost, high-speed near infrared reflectance confocal microscope," Biomed Opt Express. 2019; 10(7): 3497-505.

Johnson, Ladd E., "Enhanced early detection and enumeration of zebra mussel (*Dreissena* spp.) veligers using cross-polarized light microscopy," Hydrobiologia 312: 139-146, 1995.

Rajadhyaksha, Milind, et al. "Reflectance confocal microscopy of skin in vivo: From bench to bedside." Lasers in surgery and medicine 49.1 (2017): 7-19.

* cited by examiner

METHODS AND APPARATUS FOR HIGH-RESOLUTION MICROSCOPY

CROSS REFERENCE TO RELATED APPLICATIONS

This patent document is a 371 National Stage Application of International Patent Application No. PCT/US2022/017459, filed Feb. 23, 2022, which claims priority to and benefits of U.S. Provisional Application 63/153,010, titled “METHODS AND APPARATUS FOR HIGH-RESOLUTION TISSUE MICROSCOPY,” filed on Feb. 24, 2021. The entire disclosure of the aforementioned applications are incorporated by reference as part of the disclosure of this application.

TECHNICAL FIELD

This patent document relates to imaging devices and in particular to imaging devices for microscopy.

BACKGROUND

Scattering-based microscopy technologies, such as reflectance confocal microscopy (RCM) are promising techniques for diagnosing various diseases in a non-invasive fashion. Certain cellular structures generate scattered light signals due to the relative difference in their refractive index compared to the surrounding cellular structures. Since intrinsic contrast of the tissue is used rather than the contrast from exogenous agents, scattering-based microscopy technologies can be used to visualize cellular morphologic changes associated with certain diseases in vivo. Among clinically available in vivo microscopy approaches, reflectance confocal microscopy has been most widely used and evaluated for diagnosis of major skin diseases. However, one major pitfall of RCM is that reflected light is not specific to a particular cell. Different cells can generate similar reflectance signals, which can pose challenges in rendering diagnosis. Therefore, the need still exists to provide high-resolution non-invasive microscopy techniques which can be used to visualize cellular details with high resolution and high specificity.

SUMMARY

The disclosed embodiments, among other features and benefits, enable new microscopy devices for diagnosing various human diseases in vivo or ex vivo, including melanoma, non-melanoma skin cancers, and inflammatory skin conditions. An example optical imaging device includes a condenser positioned to receive light from a light source and send the light toward a polarizing beam splitter. The polarizing beam splitter is positioned to receive at least a portion of light that is output from the condenser, and to direct light having a first polarization toward an objective lens for illuminating a sample. The optical imaging device also includes an immersion medium positioned after the objective lens, where the immersion medium is configured to, when the sample is present, contact a surface of the sample and allow the light having the first polarization to illuminate the surface of the sample after passing through the immersion medium. Further, the objective lens is positioned to further receive scattered light from the sample after passing of the scattered light through the immersion medium. The immersion medium has a refractive index that is between 1.3 and 1.5 and the objective lens has a numeric aperture that is greater than 0.25. The polarizing beam splitter of the optical imaging device is positioned to also receive the scattered light from the objective lens and send light having a second polarization toward a focusing lens, and the focusing lens is positioned to receive the light having the second polarization and to direct focused light having the second polarization to an image plane.

DETAILED DESCRIPTION

Devices according to the technology disclosed in this patent document can provide both reflectance and absorption contrasts to visualize cellular details with high resolution and specificity. The improved specificity enabled by the disclosed technology can increase diagnostic accuracy for major skin diseases, increase diagnostic confidence, decrease time needed for rendering a diagnosis, and reduce time required for training for image reading. The disclosed technology allows using inexpensive optoelectrical components, which uniquely makes it possible to construct the microscopy devices and systems at low cost for use in a wide range of clinical settings, including rural, community, primary care, and specialty dermatology clinics. Among other features and benefits, implementations of the disclosed technology can be used to develop reflectance confocal microscopy devices to image human tissues in vivo or ex vivo (especially the human skin in vivo) and provide diagnostic information for various human diseases. The disclosed technology can be integrated with scattering-based microscopes such as reflectance confocal microscopes to simultaneously visualize non-pigmented and pigmented cells with high specificity.

Figure 1:
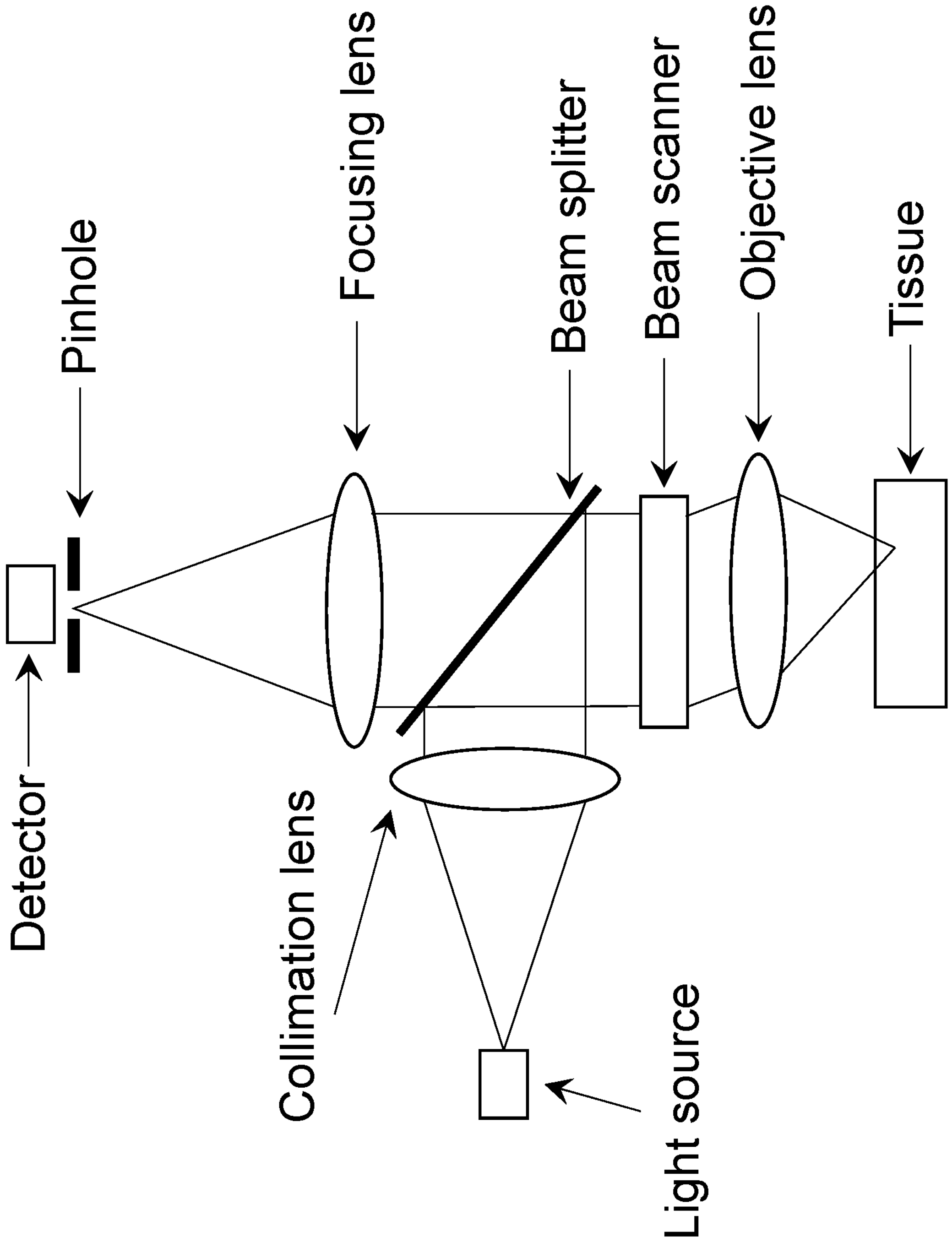
FIG. 1 illustrates a typical reflectance confocal microscopy (RCM) system.

In conventional RCM, light from a point light source is collimated, reflected by a beam splitter, and scanned by a beam scanner, as illustrated in FIG. 1. An objective lens with high numerical aperture (NA) is used to tightly focus the illumination beam. Light reflected by cellular structure is captured by the same objective lens, de-scanned by the beam scanner, transmitted by the beam splitter, and focused by a focusing lens onto a pinhole. Since the pinhole is conjugate to the illumination focus, reflected light originating from the focal point is detected by a detector, and light originating from outside the focal point is mostly rejected by the pinhole. This allows visualization of cellular structures from a thick, scattering tissue.

As mentioned above, a major pitfall of RCM is that reflected light is generally not specific to particular cells. Different cells can generate similar reflectance signal, which can pose challenges in rendering a diagnosis. For example, one such challenge is in distinguishing melanocytes from Langerhans cells, where images obtained by RCM could show the same bright dendritic cells for both conditions, which could produce wrong diagnosis. But the standard of care histopathologic diagnosis would show that the tissue corresponding to one image was melanoma while the tissue corresponding to the other image was melanocytic nevi, a benign condition. Difference in histopathologic diagnosis was likely caused by the fact that some of the bright dendritic cells shown in the second image were Langerhans cells rather than melanocytes. A method to distinguish between melanocytes and Langerhans cells is important for improving diagnostic accuracy for melanoma and other skin diseases.

Figure 2:
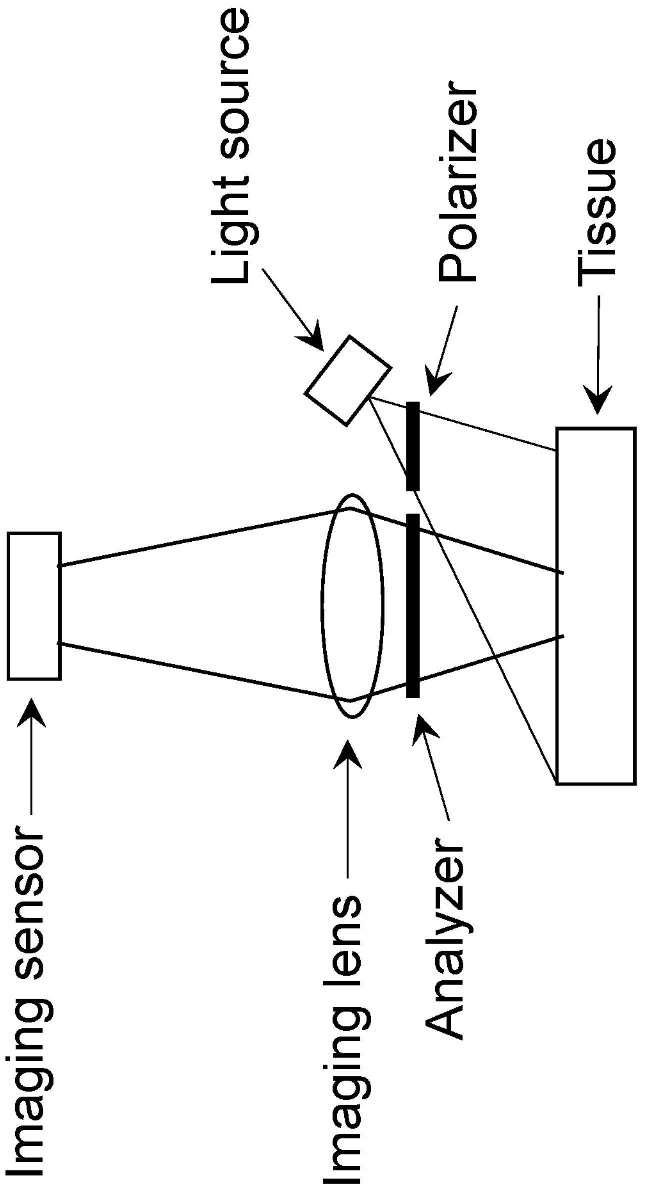
FIG. 2 illustrates an example configuration of a dermoscope.

Dermoscope is a commonly-used imaging tool in dermatology. In a dermoscope, light from an extended light source, or extended light sources, illuminates the tissue, as illustrated by the example configuration of FIG. 2. Often, a polarizer or multiple polarizers is/are used to generate linearly-polarized illumination on the tissue. Light scattered back from the tissue is imaged by an imaging lens onto an imaging sensor. An analyzer is often placed between the imaging lens and the tissue, and the analyzer has a polarization that is perpendicular to that of the polarizer. Light reflected from the tissue surface has a similar polarization state to the illumination light and therefore is mostly rejected by the analyzer. Light that is introduced into the tissue and multiply-scattered by the tissue is de-polarized, and a portion of the multiply-scattered light that has perpendicular polarization to the illumination light is transmitted through the analyzer and imaged on the imaging sensor. As the multiply-scattered light inside the tissue travels towards the objective lens, some of the light is absorbed by the tissue pigments (e.g., melanin, blood). Therefore, images acquired with a dermoscope visualize melanin as dark brown color and blood as dark red color while surrounding tissue appears bright. Conventional dermoscopes, however, have low resolution, which does not allow for visualization of individual pigmented cells. Additionally, in the dermoscope, space between the objective lens and tissue is not index-matched to the tissue, which induces spherical aberrations when imaging below the tissue surface and makes cellular imaging challenging even when a high-NA objective lens is used.

Figure 3:
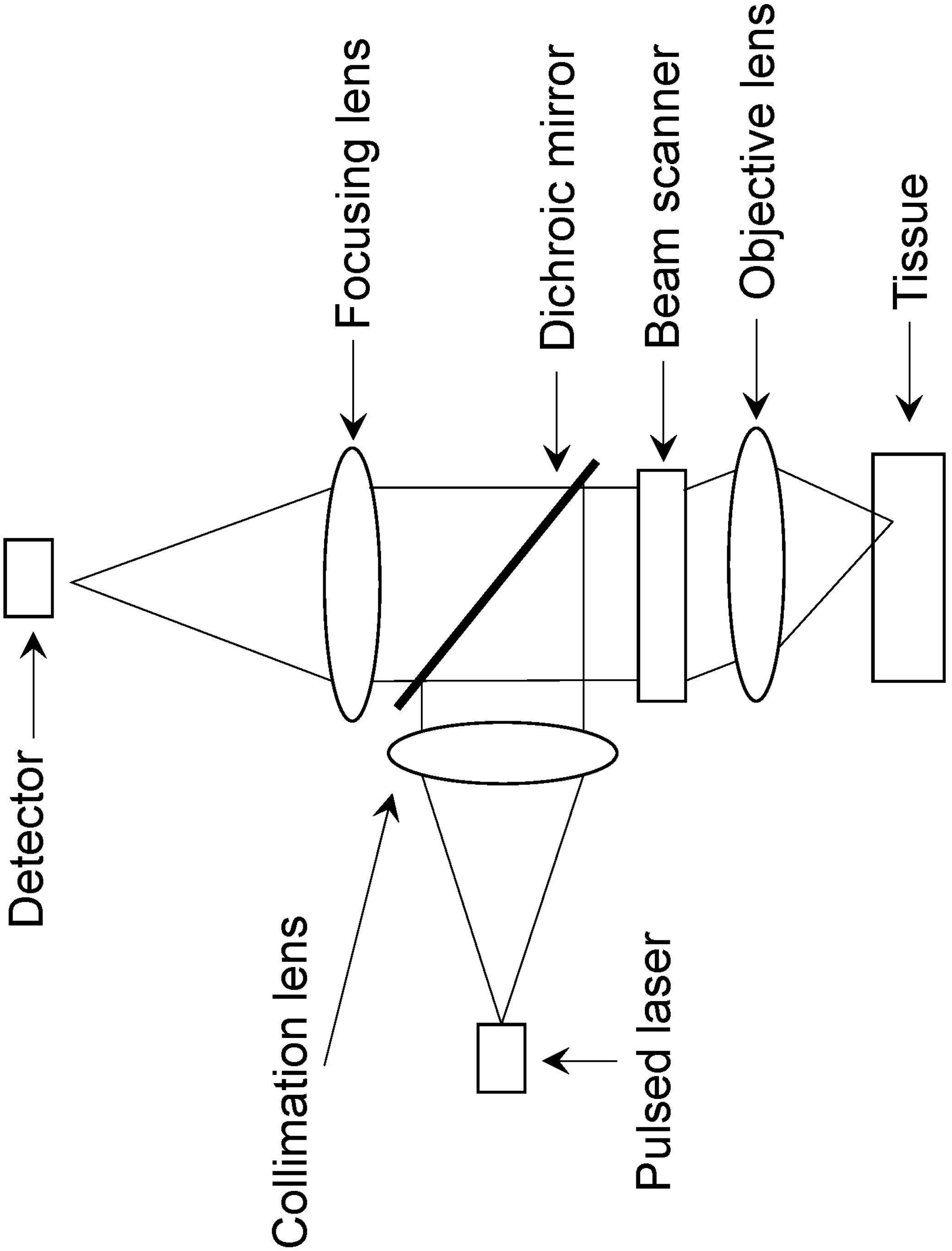
FIG. 3 illustrates an example configuration of two-photon microscope.

A two-photon microscope is a clinically available in vivo microscope that can visualize fluorescence signals from human tissue. In a two-photon microscope, light from a pulsed laser is collimated by a collimation lens, reflected by a dichroic mirror, scanned by a beam scanner, and focused by an objective lens, as illustrated in FIG. 3. Illumination light is absorbed by fluorophores inside the tissue, and fluorescence signal is generated at the fluorophores. Fluorescence light is collected by the same objective lens, transmitted through the dichroic mirror, and focused by a focusing lens onto a detector. Since melanin generates a fluorescence signal, two-photon microscope can visualize individual pigmented cells. Two-photon microscopes, however, are expensive due in-part to the use of a pulsed laser, and are slow due to the long exposure time required to collect sufficient fluorescence signals.

The embodiments disclosed in this patent document address the above-mentioned shortcomings of other technologies and produce high-resolution images in scattering-based microscopy devices, allowing visualization of cellular details with high resolution and specificity. These, and other features and benefits, are achieved at least in-part by utilizing a cross-polarized detection approach which can be combined with a high-resolution, index-matched objective lens having a high numeric aperture (e.g., NA>0.25) to visualize, for example, pigmented cells and vasculature.

Figure 4:
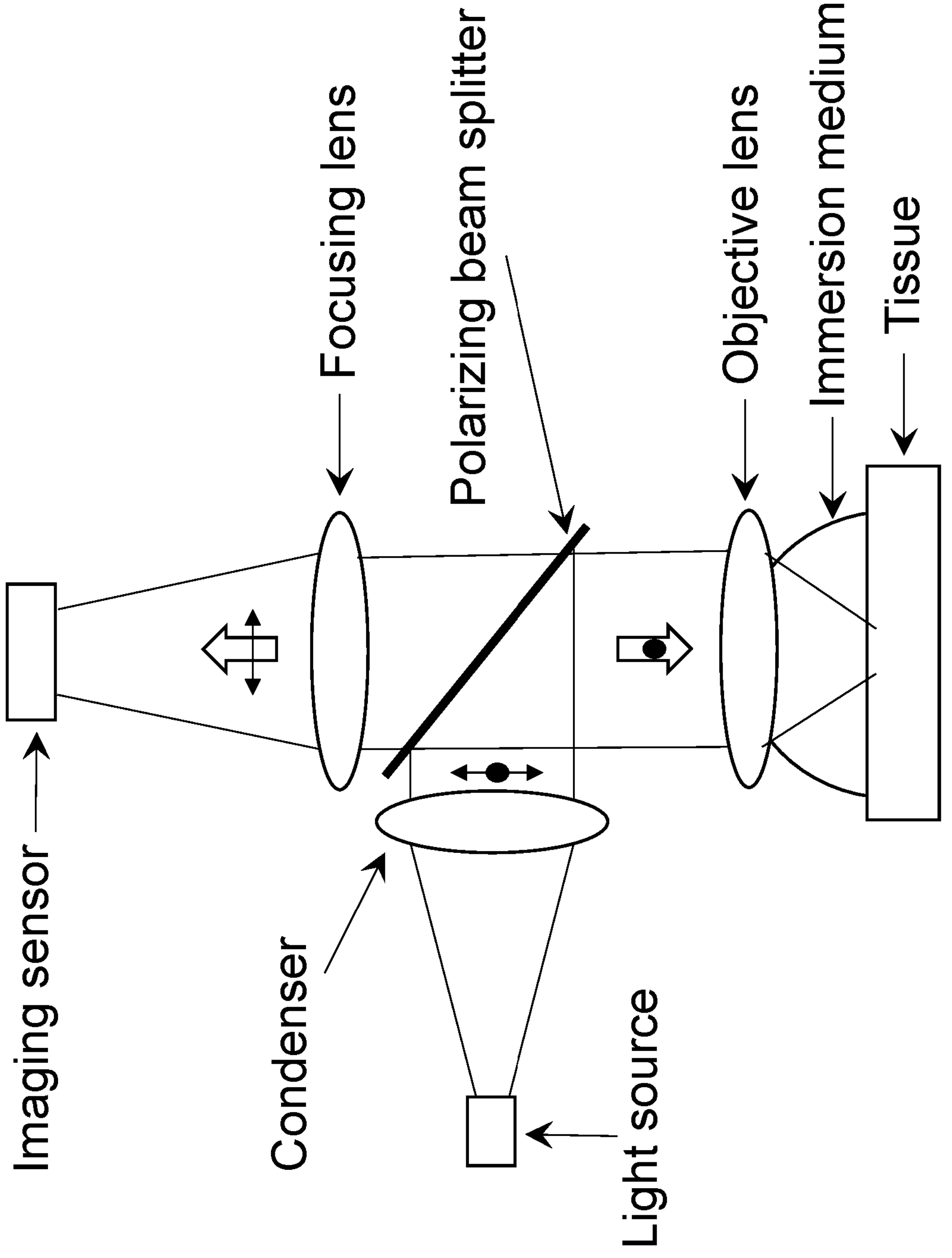
FIG. 4 illustrates a configuration of a cross-polarized microscope in accordance with an example embodiment.

An example embodiment of the cross-polarized detection device (also referred to as cross-polarized microscope) according to the disclosed technology is shown in FIG. 4. Light from an extended light source (e.g., a light-emitting diode (LED) source) is condensed by a condenser. Light at this point is de-polarized, containing all polarization states. At a polarizing beam splitter, beam having a first polarization (e.g., s-polarized beam with field oscillating in and out of the view of FIG. 4) is reflected and directed towards an objective lens. An objective lens with a high NA (e.g., NA>0.25) focuses the illumination light onto the tissue through an immersion medium that is positioned between the objective and the tissue. In this example, illumination on the tissue, therefore, is s-polarized. Multiply-scattered beam from the tissue is captured by the same objective lens. At the polarizing beam splitter, light with an orthogonal polarization (e.g., p-polarized portion of the multiply-scattered beam having a polarization state that is orthogonal to that of the s-polarized beam) is transmitted through and focused by a focusing lens onto an imaging sensor.

Due to the cross-polarized nature of the detection, specular reflection from the tissue surface is mostly rejected. While this example embodiment does not provide an optical sectioning capability as in RCM, the use of a high-NA objective lens and sparsity of pigmented cells make it possible to clearly visualize individual pigmented cells. Use of an immersion medium with a refractive index of, e.g., 1.3-1.5, is important, as it reduces (i) specular reflection from the tissue surface and (ii) spherical aberrations when imaging underneath the tissue surface.

The immersion medium which can be used in embodiments of the disclosed technology disclosed can be, for example, water, oil or other liquid or gel. In some implementations, the immersion medium can have a refractive index that is similar to that of water. According to certain example embodiments, the immersion medium can fill a volume between an objective lens of a cross-polarized detection device according to the disclosed technology and a sample (e.g., a tissue).

The objective lens which can be used in embodiments of the disclosed technology can be, for example, a water-immersion objective lens, an oil-immersion objective lens or any other objective lens that is adapted for use with an immersion medium.

In some example embodiments of the disclosed technology, the imaging sensor can be an imaging sensor of a mobile device (e.g., a smartphone or a tablet).

Figure 5:
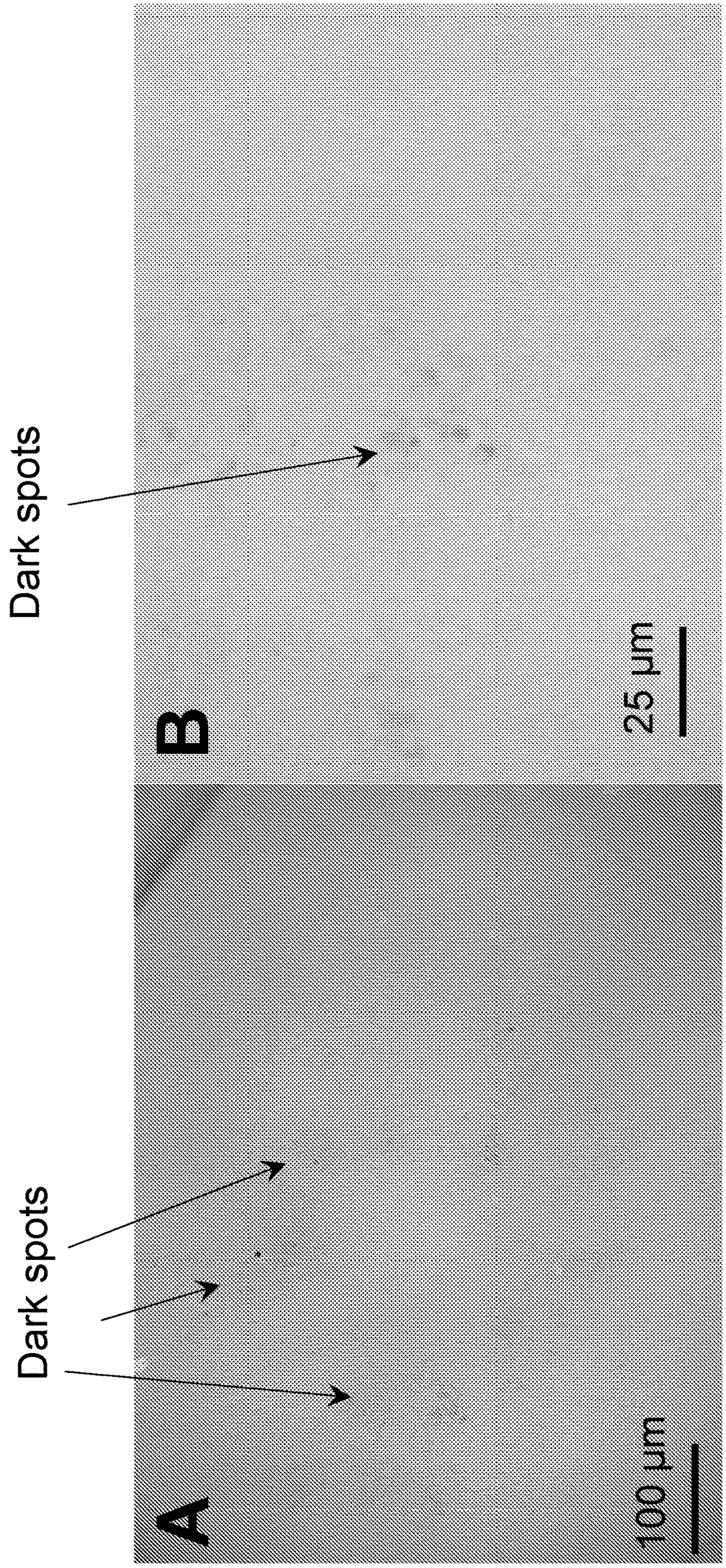
FIG. 5 illustrates example images acquired using an implementation of the cross-polarized microscope of FIG. 4.

FIG. 5 shows example images acquired using an implementation of the example embodiment of the cross-polarized detection device shown in FIG. 4. The images were acquired from human skin in vivo. Distribution of melanin is visualized as scattered dark spots in the panel A of FIG. 5. In a higher-magnification view shown in the panel B of FIG. 5, details of individual pigmented cells are well visualized.

Figure 6:
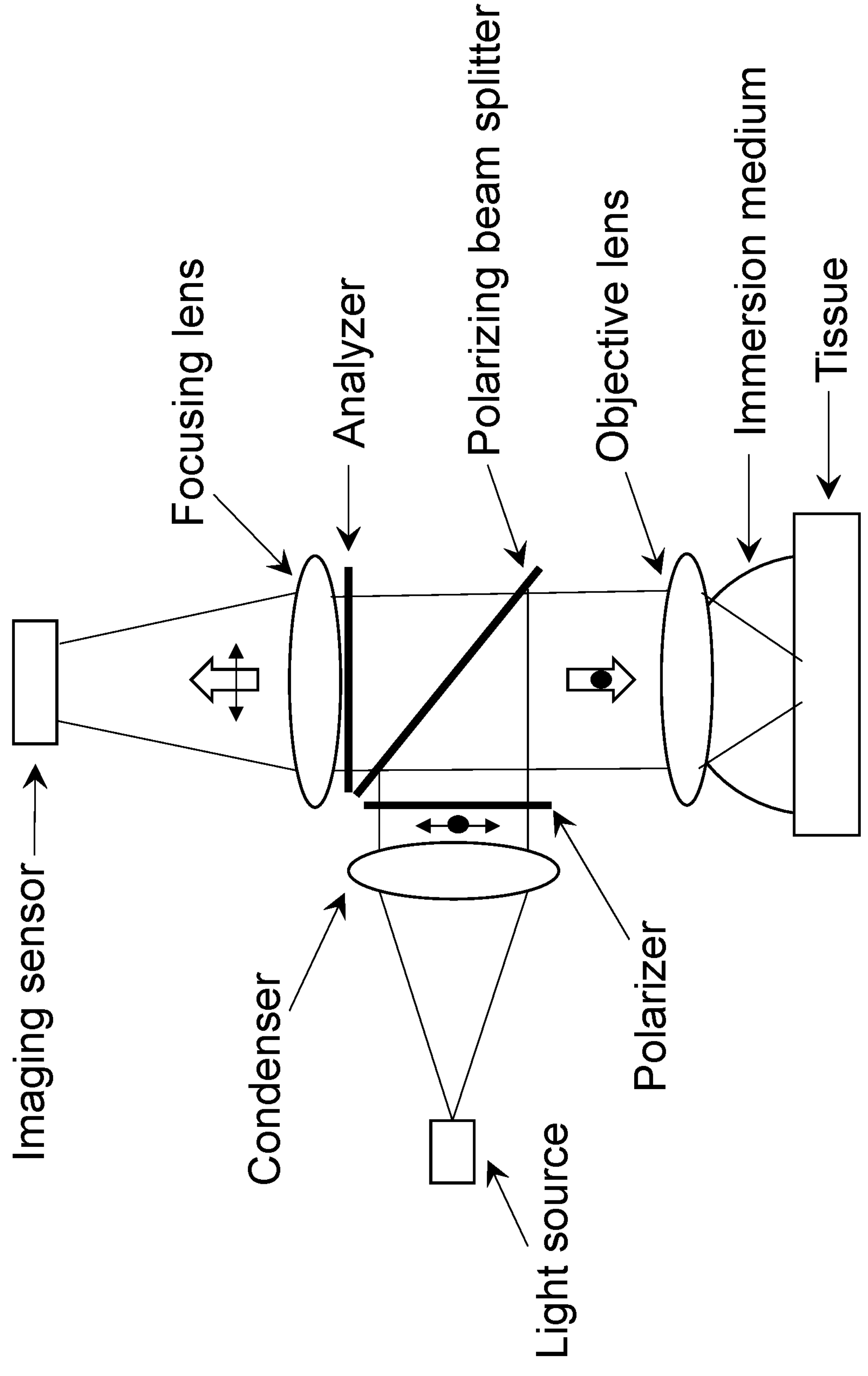
FIG. 6 illustrates a configuration of a cross-polarized microscope in accordance with another example embodiment.

FIG. 6 shows another example embodiment of the cross-polarized detection device according to the disclosed technology. In this embodiment, as shown in FIG. 6, a polarizer is used between the condenser and polarizing beam splitter, and an analyzer is used between the polarizing beam splitter and the focusing lens. Use of the polarizer and analyzer can further increase the efficiency of rejecting specular reflection from the tissue surface. The remaining components are similar to those described in connection with FIG. 4.

Figure 7:
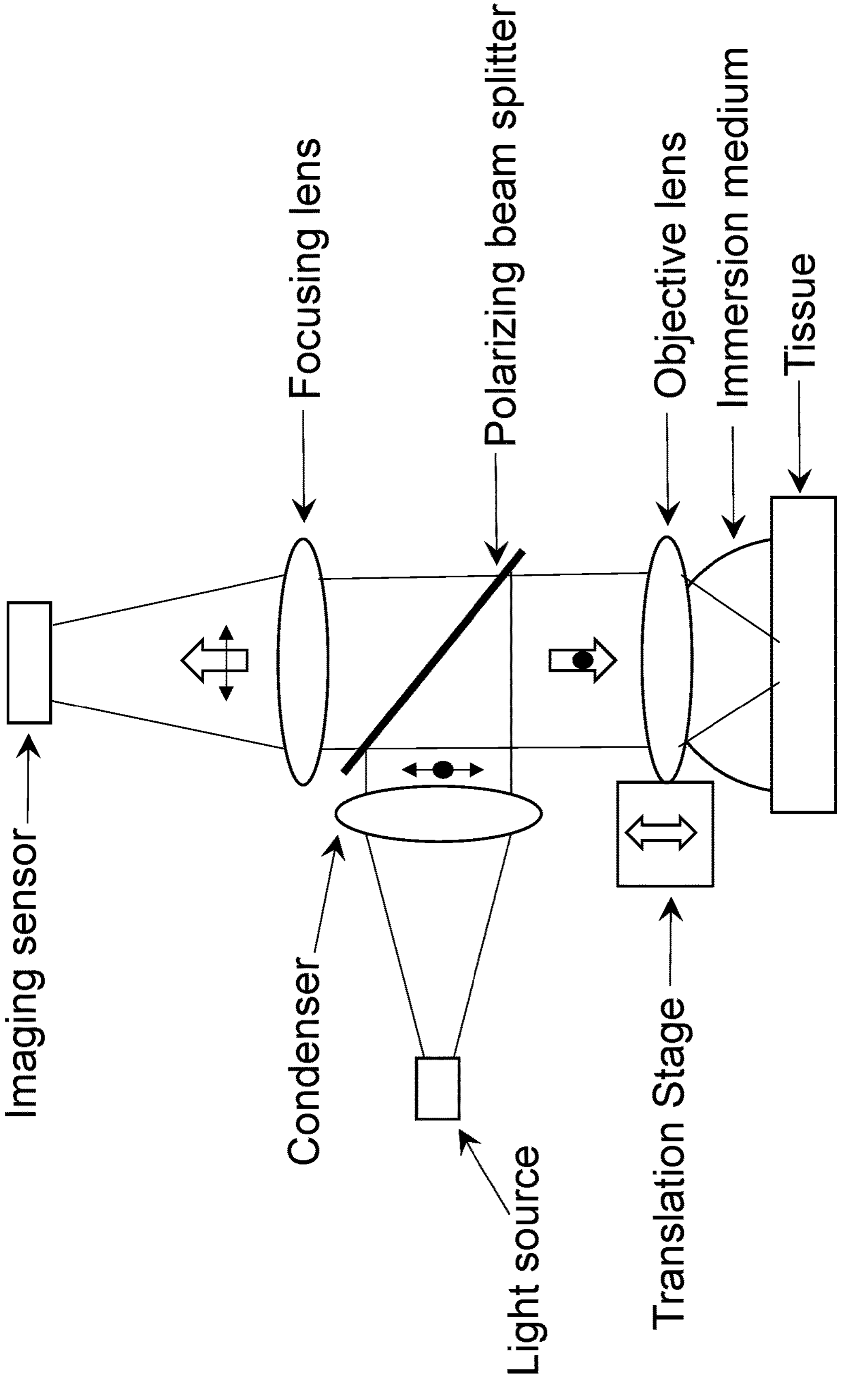
FIG. 7 illustrates a configuration of a cross-polarized microscope in accordance with yet another example embodiment.

FIG. 7 shows yet another example embodiment of the cross-polarized detection device according to the disclosed technology. According to this embodiment, a translation stage is connected to the objective lens of the device and can move the objective lens along the axial direction to change the distance between the objective lens and a sample (e.g., a tissue) in order to acquire microscopy images of the sample from different imaging depths. The translation stage can be, for example, a motorized translation stage to realize automated three-dimensional imaging of the tissue. The remaining components are similar to those described in connection with FIGS. 4 and 6.

Figure 8:
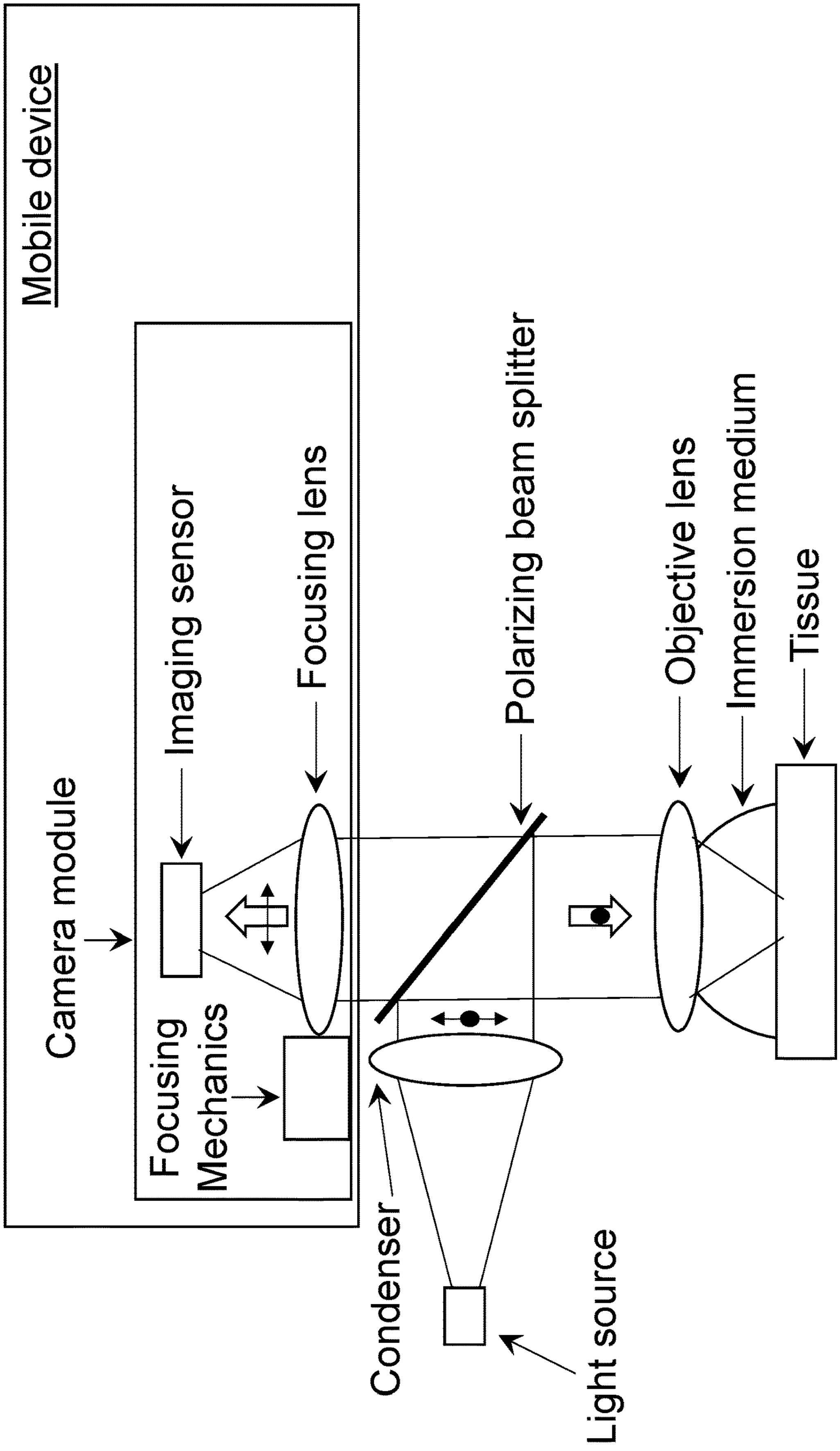
FIG. 8 illustrates a configuration of a cross-polarized microscope in accordance with an example embodiment that incorporates some of the components of a mobile device.

FIG. 8 shows an example embodiment of the cross-polarized detection device according to the disclosed technology. In the embodiment illustrated in FIG. 8, a camera module of a mobile device (e.g., a smartphone or a tablet) is used for generating and acquiring microscopy images. The camera module can include, for example, an imaging sensor, a focusing lens, and a focusing mechanism. The focusing mechanism (e.g., a translation stage) can be used to axially scan the focusing lens, which enables change of the imaging depth. This embodiment utilizes the image acquisition unit (including, e.g., the imaging sensor), image display unit (including, e.g., a screen of the mobile device), and axial scanning unit (including, e.g., the focusing mechanism) of the mobile device, which can reduce the size, cost, and complexity of the cross-polarized detection device according to the technology disclosed herein. The components in FIG. 8 depicted outside of the mobile device can be similar to those described in connection with previous figures. In some embodiments, the processor of the mobile device is used to process the signals associated with the images locally and perform other operations, as may be needed, to enhance the obtained images. In some embodiments, at least some of the image processing operations may be done additionally, or alternatively, remotely, such as on the cloud or a remote server.

Figure 9A:
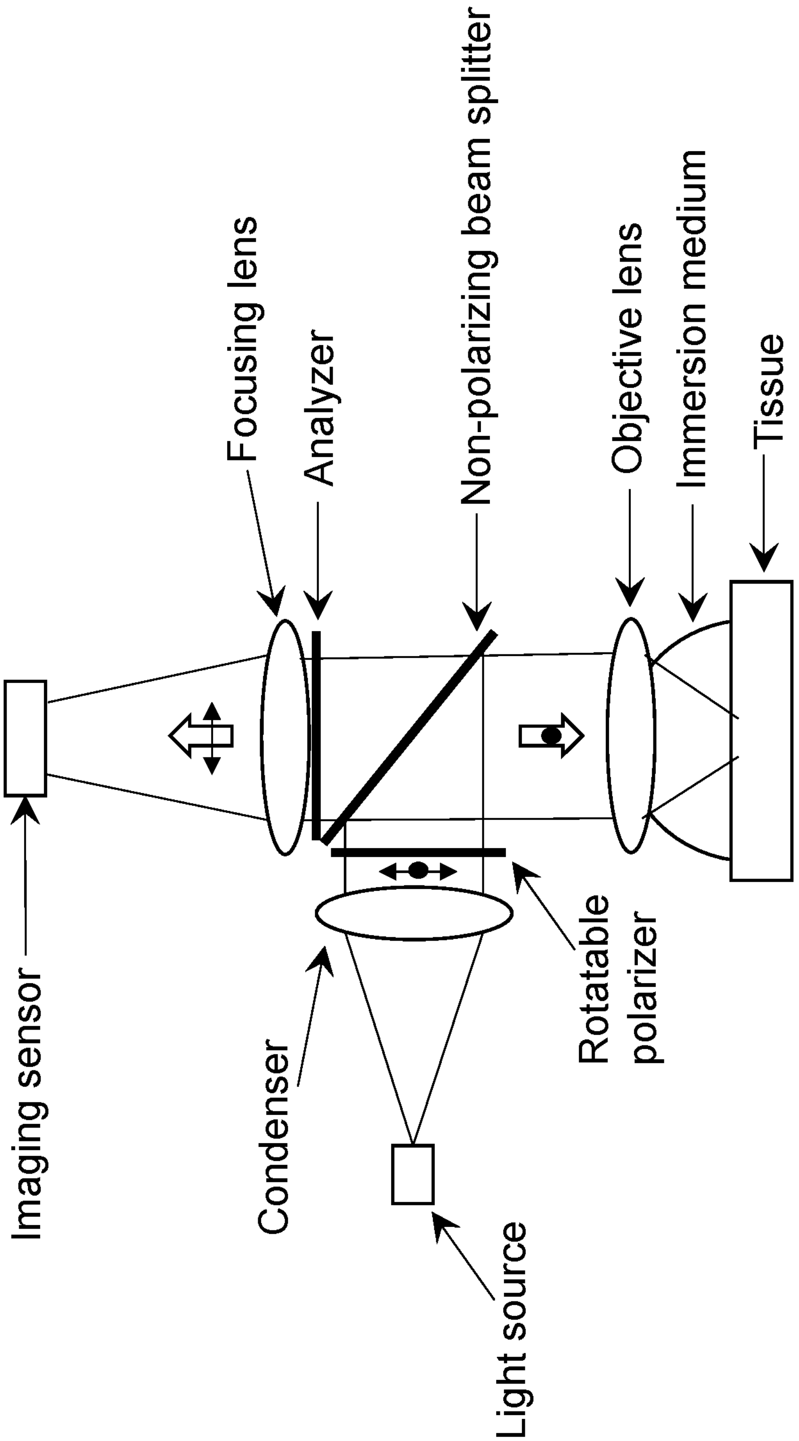
FIG. 9A illustrates a configuration of a cross-polarized microscope in accordance with an example embodiment that includes a rotatable polarizer.
Figure 9B:
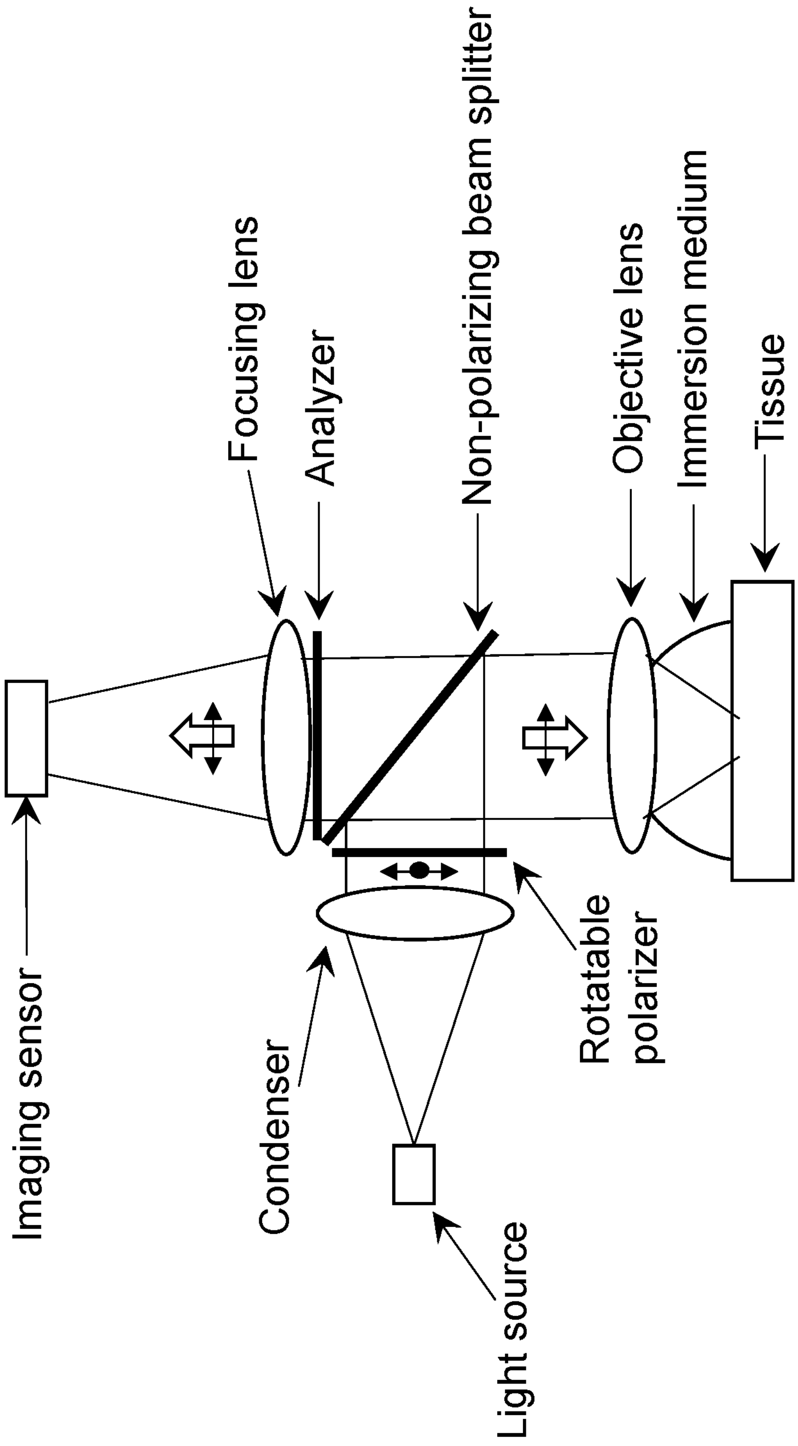
FIG. 9B illustrates a configuration of a cross-polarized microscope in accordance with an example embodiment with a different polarization state of the illumination light beam compared to FIG. 9A.

In an example embodiment of the cross-polarized detection device according to the disclosed technology illustrated in FIGS. 9A and 9B, a rotatable polarizer is used between the condenser and a non-polarizing beam splitter. This embodiment makes it possible to change the illumination polarization and enables both cross-polarized detection (FIG. 9A) and parallel-polarized detection (FIG. 9B) from the same location of the tissue. Parallel-polarized detection can be useful in identifying the tissue surface, which in turn can help provide depth of pigmented cells relative to the tissue surface. The polarization state of the light beam illuminating the tissue that is created by the rotatable polarizer in the configuration shown in FIG. 9A is orthogonal to the polarization state of the light that can be transmitted by the analyzer positioned between the non-polarizing beam splitter and the focusing lens (FIG. 9A). In the configuration shown in FIG. 9B, the polarization state of the light beam illuminating the tissue that is created by the rotatable polarizer is colinear with the polarization state of the light that can be transmitted by the analyzer positioned between the non-polarizing beam splitter and the focusing lens (FIG. 9B). The rotatable polarizer can be adjusted, for example, manually. In other implementations, the rotatable polarizer can be controlled and adjusted using, for example, a controller and a motorized actuator. Other components in FIGS. 9A and 9B not explicitly described can be similar to those described in connection with previous figures.

Figure 10A:
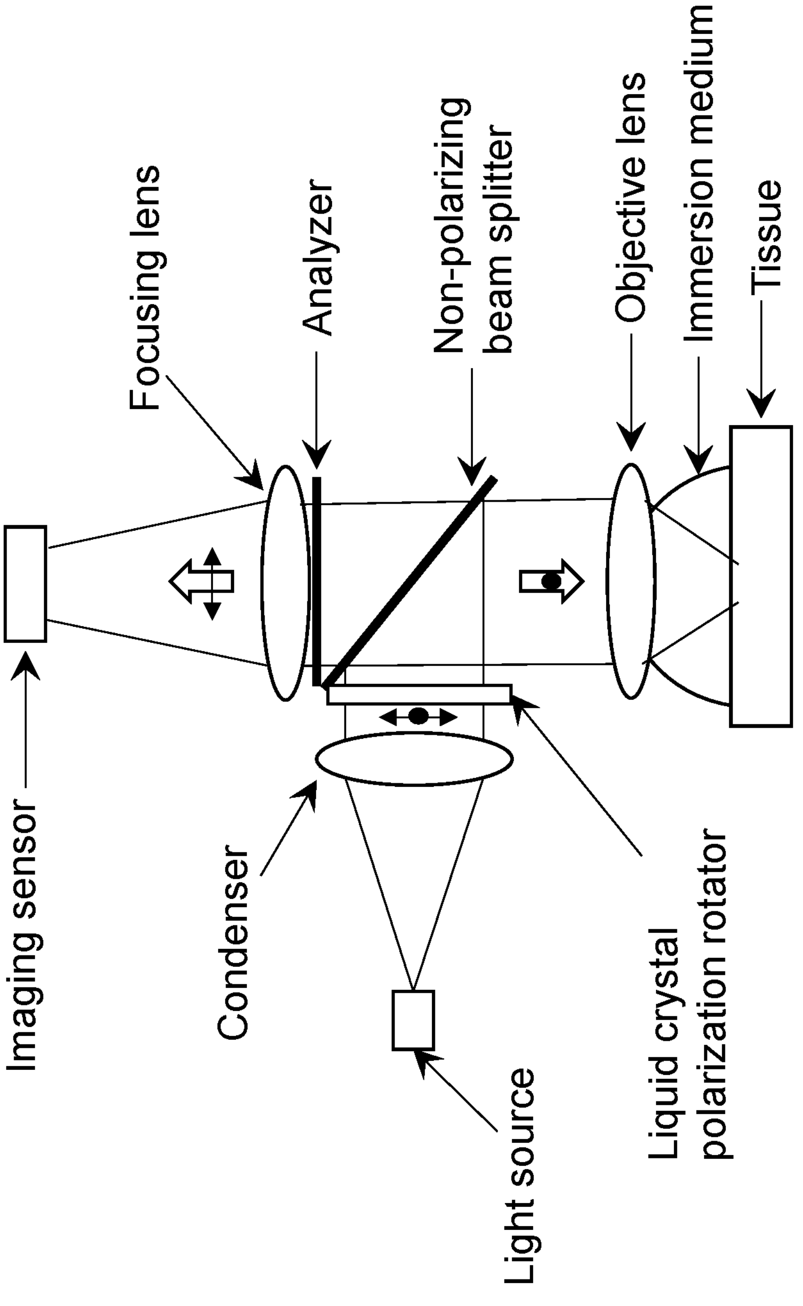
FIG. 10A illustrates a configuration of a cross-polarized microscope in accordance with an example embodiment that includes a liquid crystal polarization rotator.
Figure 10B:
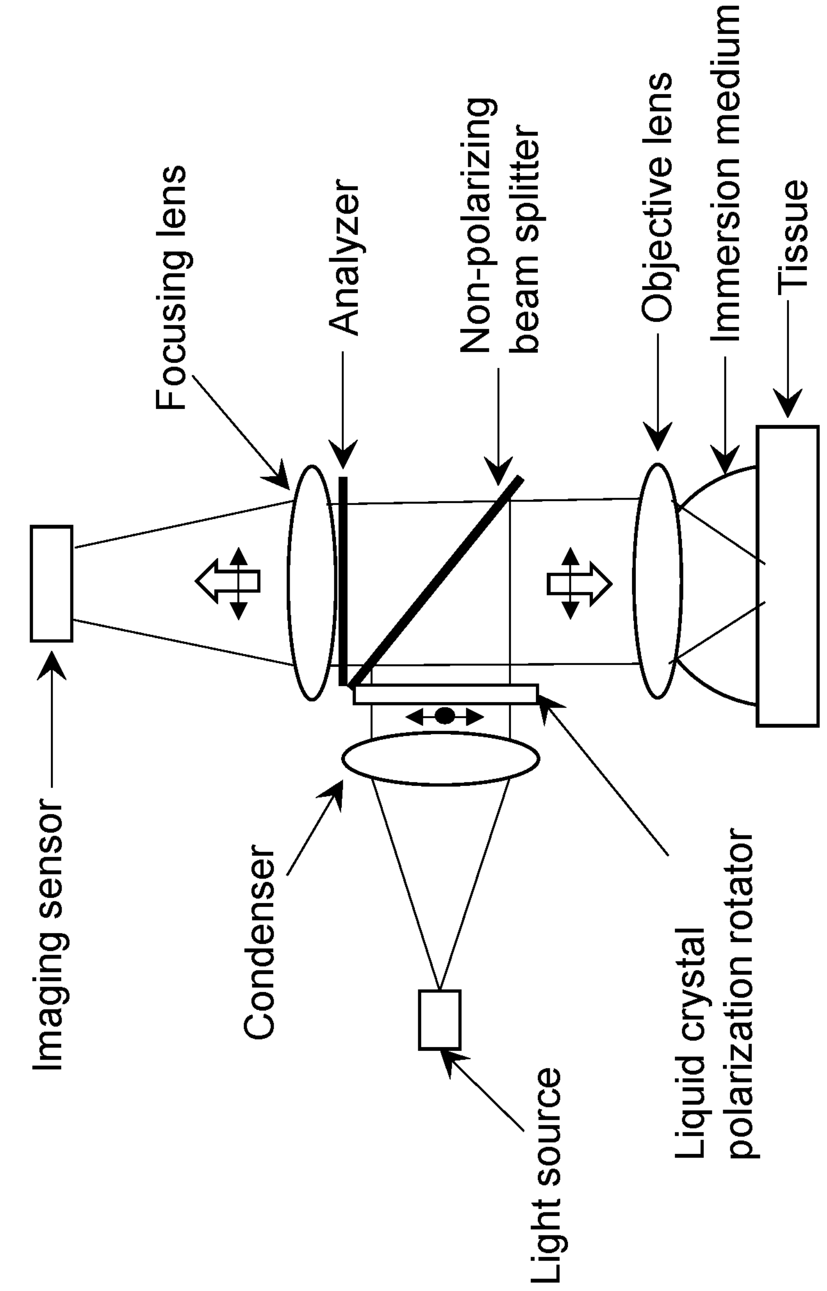
FIG. 10B illustrates a configuration of a cross-polarized microscope in accordance with an example embodiment with a different polarization state of the illumination light beam compared to FIG. 10A.

In an example embodiment of the cross-polarized detection device according to the disclosed technology illustrated in FIGS. 10A-B, a liquid crystal polarization rotator is used between the condenser and the non-polarizing beam splitter instead of the rotatable polarizer. This embodiment allows for rapid change of the illumination polarization using electrical control of the liquid crystal polarization rotator. Speed of polarization modulation can be faster than 500 Hz, which is faster than speed of a typical imaging sensor. Therefore, this embodiment can facilitate rapid, sequential acquisition of a cross-polarized image (FIG. 10A) and a parallel-polarized image (FIG. 10B) from the same tissue location. Other components in FIGS. 10A and 10B not explicitly described can be similar to those described in connection with previous figures.

Figure 11:
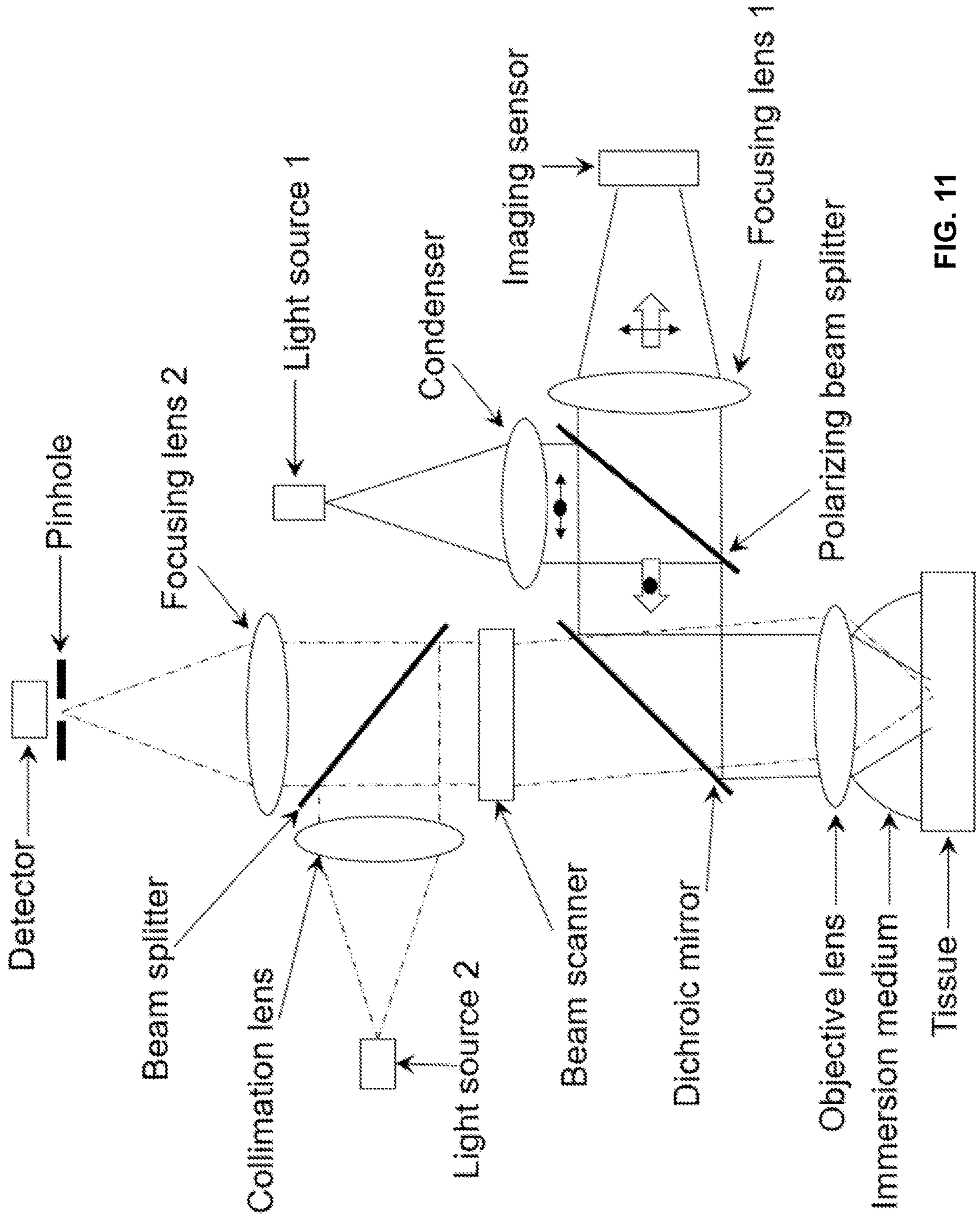
FIG. 11 illustrates a system in which a reflectance confocal microscope is combined with a cross-polarized detection device in accordance with an example embodiment.

FIG. 11 shows an example embodiment of a system according to the disclosed technology in which a reflectance confocal microscope (RCM) is combined, through a dichroic mirror, with a cross-polarized detection device (also referred to as cross-polarized microscope) according to the disclosed technology. Near infrared (NIR) light (dotted rays in FIG. 11 as well as in FIGS. 12 and 13) used for RCM is transmitted through the dichroic mirror while visible light (solid rays in FIG. 11 as well as in FIGS. 12 and 13) used for the cross-polarized microscope is reflected by the dichroic mirror. The components exclusive to the RCM include the detector, the pinhole, focusing lens 2, beam splitter, collimation lens, light source 2, and the beam scanner, while the objective lens and dichroic mirror are shared between the RCM and the cross-polarized detection device. The components exclusive to the latter include the imaging sensor, focusing lens 1, polarizing beam splitter, condenser, and light source 1. By using the same objective lens for RCM and cross-polarized microscope, two different image contrasts can be achieved simultaneously: reflectance contrast by RCM and absorption contrast by cross-polarized microscope. Addition of the absorption contrast to the reflection contrast can greatly improve the capability of distinguishing melanocytes from Langerhans cells as melanocytes absorb visible light significantly more than Langerhans cells. The visible light source (light source 1 in FIG. 11) used with the cross-polarized microscope in the embodiment of the system shown in FIG. 11, as well as any of the visible light sources used with any embodiments of the cross-polarized microscope according to the technology disclosed herein, can be, for example, a light source (e.g., an extended light source) capable of emitting light on one or more wavelengths in the range between 400 nm and 700 nm. The near infrared light source used with the RCM in the embodiment of the system shown in FIG. 11 (light source 2 in FIG. 11) can be, for example, an NIR light source capable of emitting light on one or more wavelengths in the range between 750 nm and 1500 nm. Any of the light sources that can be used with the disclosed technology can include, for example, LEDs and/or lasers.

Figure 12:
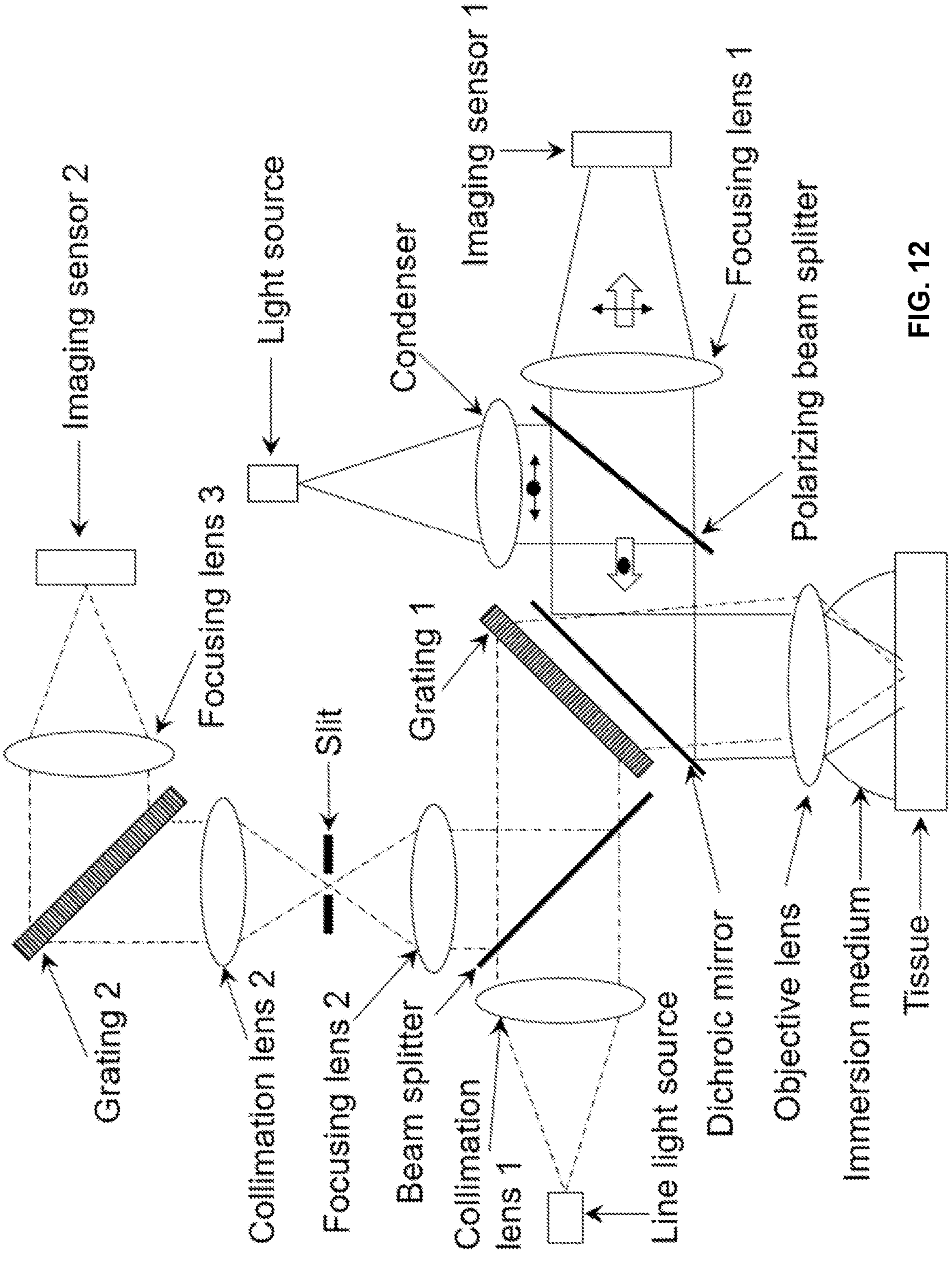
FIG. 12 illustrates a system in which a reflectance confocal microscope is combined with a cross-polarized microscope in accordance with another example embodiment.

FIG. 12 shows another example embodiment of a system according to the disclosed technology in which an RCM is combined, through a dichroic mirror, with a cross-polarized microscope according to the technology disclosed in this patent document. In the embodiment illustrated in FIG. 12, reflectance confocal microscopy is conducted by spectral encoding. Light from a line source (e.g., LED light filtered by a narrow illumination slit) is collimated by collimation lens 1, transmitted through a beam splitter, and diffracted by grating 1. Different wavelengths are diffracted at different angles by grating 1 and focused to different lines on the tissue by the objective lens. Reflected light from the tissue is collected by the same objective lens, diffracted by grating 1, reflected by the beam splitter, and focused on a slit by focusing lens 2. Light filtered by the slit is collimated by collimation lens 2, diffracted by grating 2, and focused by focusing lens 3 on imaging sensor 1. In this embodiment, confocal images are acquired without having to scan a focused light beam across the tissue. This embodiment makes it possible to build an RCM device at low cost. Additionally, the use of an imaging sensor rather than a point detector as in conventional RCM (e.g., FIG. 1 and part of FIG. 11) makes it possible to increase the imaging speed significantly.

Figure 13:
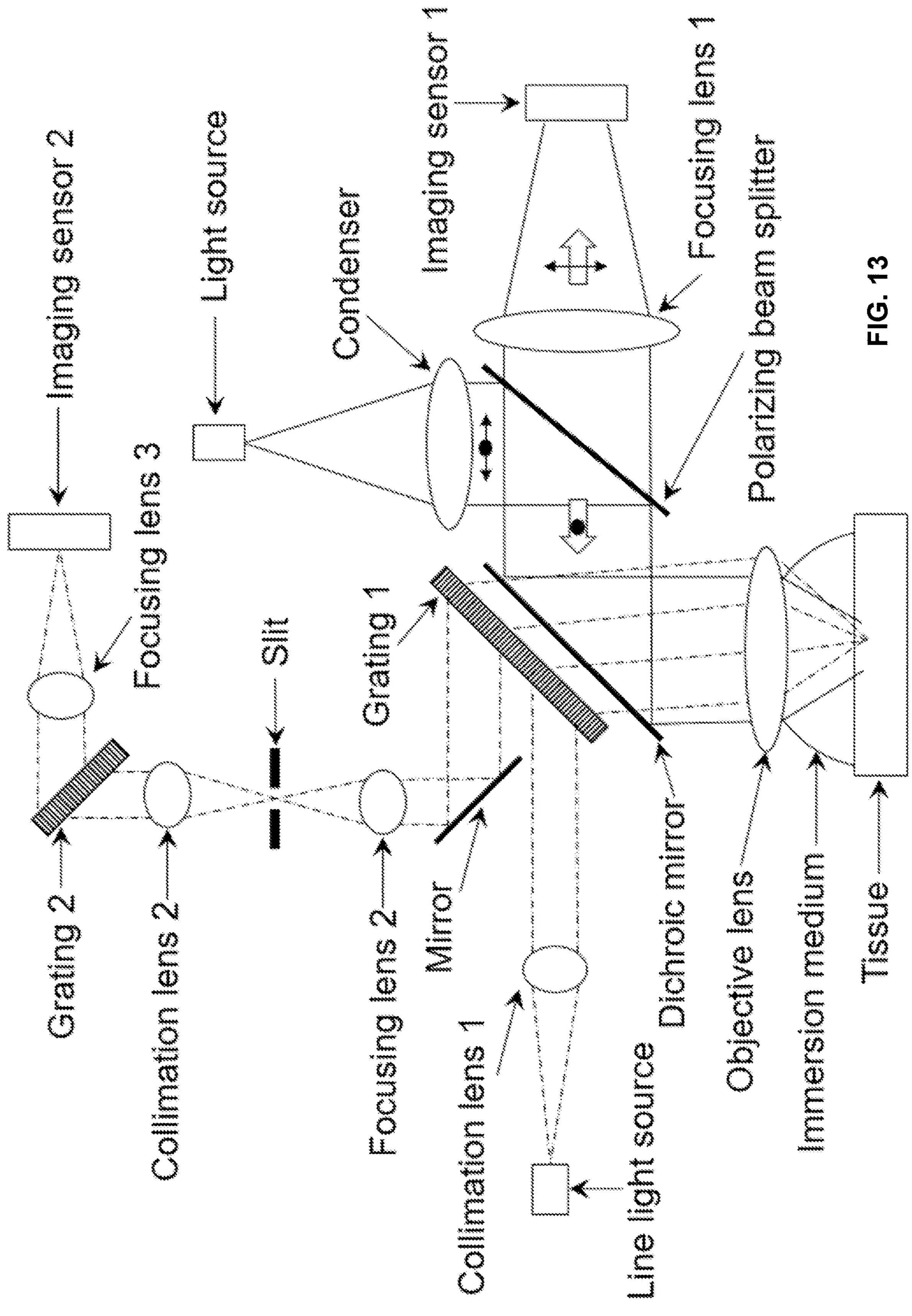
FIG. 13 illustrates a system in which a reflectance confocal microscope is combined with a cross-polarized microscope in accordance with yet another example embodiment.

FIG. 13 shows yet another example embodiment of a system according to the disclosed technology in which an RCM is combined, through a dichroic mirror, with a cross-polarized microscope according to the technology disclosed herein. In the embodiment illustrated in FIG. 13, RCM is conducted by spectral encoding and divided-pupil approach. In this embodiment, a first sub-portion of the objective lens pupil is used for illumination and a second sub-portion of the objective lens pupil is used for detection. In particular, in the example configuration of FIG. 13, the illumination path of the RCM includes the line light source, collimation lens 1, and grating 1 (also used detection path) that provide the illumination light to the dichroic mirror, to the objective lens, immersion medium and onto the tissue. The detection path of the RCM includes the imaging sensor, focusing lens 3, grating 2 collimation lens 2, the slit, focusing lens 2, the mirror, and the grating, a section of which is positioned to receive light from sample after going through a section of the immersion medium, a section of the objective lens, and a section of the dichroic mirror. By having separate beam paths for illumination and detection, image contrast can be increased when imaging deeper, and specular reflection from the optical elements can be reduced resulting in less background noise.

Figure 14:
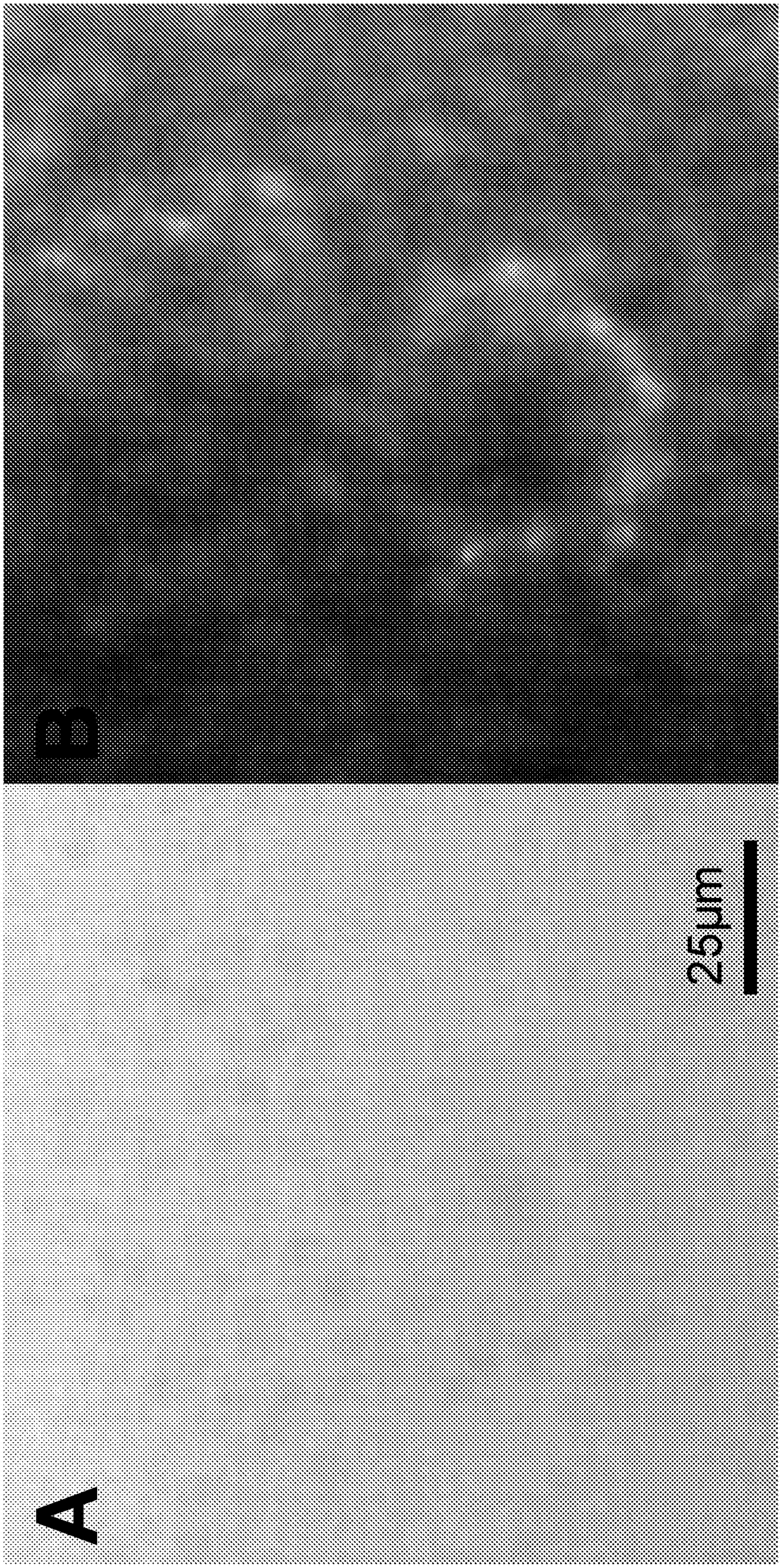
FIG. 14 shows example co-registered images of reflectance confocal microscopy and cross-polarized microscopy collected using an example system of the disclosed technology.

FIG. 14 shows example co-registered images of RCM and cross-polarized microscopy collected using an embodiment of a system according to the disclosed technology. In the cross-polarized microscopy image (panel A in FIG. 14), melanin surrounding the dermal papilla is visualized as dark dots or dark spots. In the RCM image (panel B in FIG. 14), melanin surrounding the dermal papilla is visualized as bright dots or bright spots. Therefore, each location of the tissue can provide both absorption (by cross-polarized microscopy) and scattering (by RCM) contrast information, which can be used to distinguish among RCM-bright cells (e.g., melanocytes, Langerhans cells, etc.).

Figure 15:
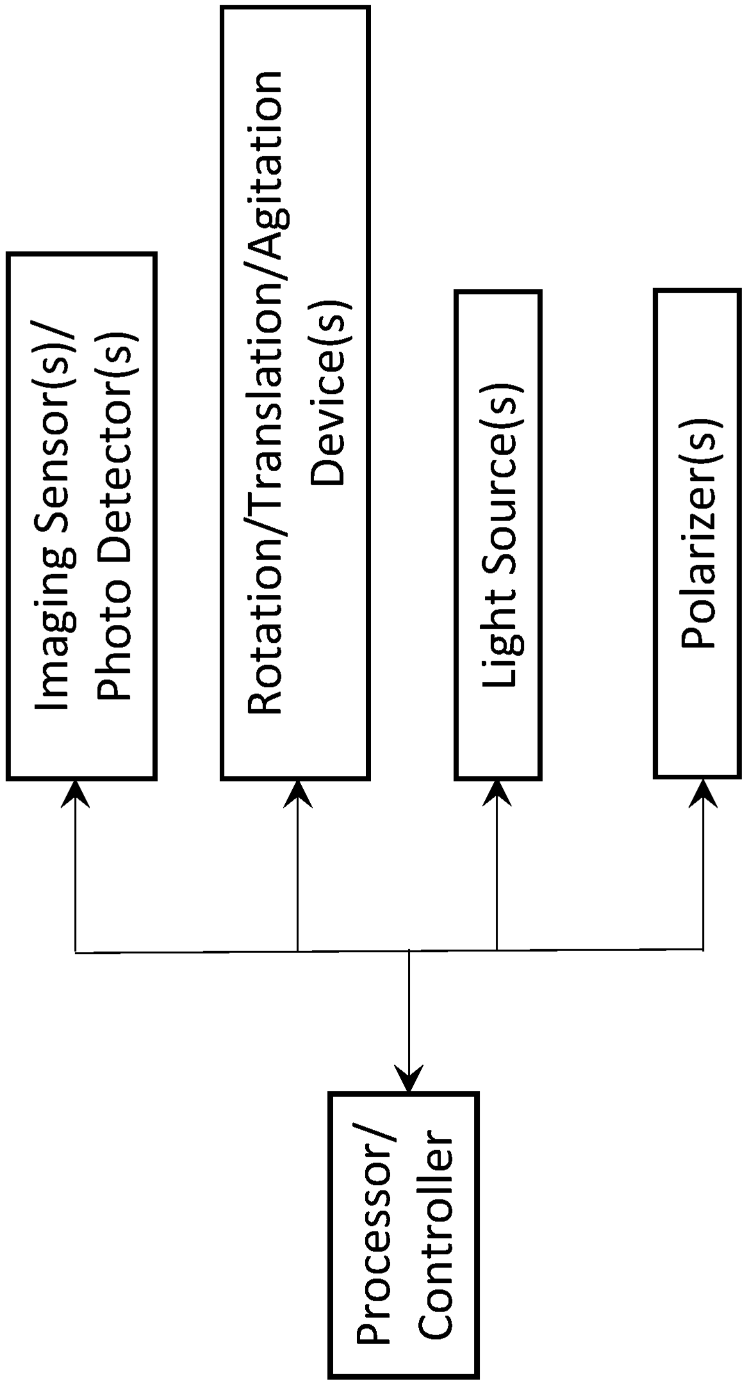
FIG. 15 illustrates a block diagram of example components that can be used to control the operations of systems and devices in accordance with the disclosed embodiments.

FIG. 15 illustrates a block diagram of various components that can be used to control the operations of systems and devices in accordance with some example embodiments of the disclosed technology. In particular, a processor/controller is configured to communicate with translation/rotation/agitation device(s) (e.g., a translation stage), imaging sensor(s)/photo detector(s), light source(s), and polarizer(s) (e.g., a liquid crystal polarization rotator). The translation/rotation/agitation device(s) can be coupled to the lens(es) (e.g., an objective lens), mirror(s), beam splitter(s), condenser(s), collimator(s), grating(s), polarizer(s), diffuser(s), waveguide(s), fiber(s), and the like, and are controlled by the processor/controller to control their movement (e.g., translation, rotation, etc.) as a function of time. The processor/controller can further include, or be coupled to, a memory that stores processor executable code that causes the processor/controller to generate and transmit/receive suitable information to/from the various system components, as well as suitable input/output (IO) capabilities (e.g., wired or wireless) to transmit and receive commands and/or data to and/or from the translation/rotation/agitation device(s), the imaging sensor(s)/photo detector(s), the light source(s), and polarizer(s). The imaging sensor may be part of a camera (e.g., a camera of a mobile device) and can include a CCD, a CMOS or another light sensing device. The photo detector can be, for example, a photomultiplier. The processor/controller may receive the information associated with images captured by the imaging sensor, and further process that information to produce images suitable for display and/or further processing. In some embodiments, the processor/controller may only be in communication with the rotation/translation/agitation device(s), and one or more of the remaining components (e.g., the light source or imaging sensor) may be controlled via separate controllers, or operated manually (e.g., in the case of the light source).

One aspect of the disclosed embodiments relates to an optical imaging device that includes a condenser positioned to receive light from a light source and send the light toward a polarizing beam splitter. The polarizing beam splitter is positioned to receive at least a portion of light that is output from the condenser, and to direct light having a first polarization toward an objective lens for illuminating a sample. The optical imaging device also includes an immersion medium positioned after the objective lens, wherein the immersion medium is configured to, when the sample is present, contact a surface of the sample, and to allow the light having the first polarization to illuminate the surface of the sample after passing through the immersion medium. The objective lens is positioned to further receive scattered light from the sample after passing of the scattered light through the immersion medium. The immersion medium has a refractive index that is between 1.3 and 1.5 and the objective lens has a numeric aperture that is greater than 0.25. The polarizing beam splitter is positioned to also receive the scattered light from the objective lens and send light having a second polarization toward a focusing lens. Further, the focusing lens is positioned to receive the light having the second polarization and to direct focused light having the second polarization to an image plane.

In one example embodiment, the objective lens is coupled to a translation stage configured to impart translational movements to the objective lens. In another example embodiment, the optical imaging device further includes a processor coupled to the translation stage, where the processor is configured to cause the translation stage to move. In yet another example embodiment, the optical imaging device further includes an imaging sensor positioned at the image plane. In still another example embodiment, the imaging sensor is an imaging sensor of a camera of a mobile device. In another example embodiment, the focusing lens is a focusing lens of the camera of the mobile device. In one example embodiment, the second polarization has a different polarization state than the first polarization.

According to another example embodiment, the optical imaging device of further includes a polarizer positioned to receive the light that is output from the condenser and to provide light having a third polarization toward the polarizing beam splitter. The optical imaging device in this example embodiment also includes an analyzer positioned to receive the light having the second polarization and to provide light having a fourth polarization toward the focusing lens. In one example embodiment, the third polarization has a different polarization state than the fourth polarization. In one example embodiment, the polarizer is a rotatable polarizer, while in another example embodiment, the polarizer is a liquid crystal polarization rotator.

In one example embodiment, the optical imaging device is implemented as part of an imaging system that further includes a reflectance confocal microscope, wherein the imaging system includes a dichroic mirror, and wherein the dichroic mirror and the objective lens are configured to receive light associated with both the optical imaging device and the reflectance confocal microscope. In another example embodiment, the imaging system includes one or more diffraction gratings as part of the reflectance confocal microscope to effectuate spectral encoding by allowing different wavelengths of light incident on one of the one or more diffraction gratings to be diffracted at different angles for illumination onto different lines on the sample by the objective lens. In still another example embodiment, the reflectance confocal microscope has a divided-pupil configuration, where a first sub-portion of the objective lens pupil is configured to provide illumination and a second sub-portion of the objective lens pupil is configured receive light from the sample for producing an image of the sample.

In another example embodiment, the optical imaging device further includes a dichroic mirror positioned to receive the light having the first polarization and direct the light having the first polarization toward the objective lens. The dichroic mirror is positioned to also receive the scattered light from the objective lens and to direct the scattered light toward the polarizing beam splitter. The optical imaging device also includes a collimation lens positioned to receive light from a second light source, and a beam splitter positioned to receive light that is output from the collimation lens and direct the received light that is output from the collimation lens toward a beam scanner. The beam scanner is positioned to receive light from the beam splitter and direct scanned light toward the dichroic mirror. The dichroic mirror is positioned to also receive the scanned light and direct the scanned light towards the objective lens. Further, the objective lens is positioned to also receive the scanned light that is directed to the objective lens by the dichroic mirror and direct the scanned light toward the sample for illuminating the sample; the objective lens is positioned to also receive reflected light from the sample after the reflected light passes through the immersion medium and direct the reflected light toward a second focusing lens along an optical path through the dichroic mirror, the beam scanner and the beam splitter. Additionally, the second focusing lens is positioned to focus the light that is incident thereon onto a pinhole to enable producing an image at a focal plane of the second focusing lens.

In one example embodiment, the light source is configured to produce light having a first spectral content and the second light source is configured to produce light having a second spectral content that is different from the first spectral content. In another example embodiment, the light source is configured to generate light having one or more wavelengths in the range between 400 nm and 700 nm. In still another example embodiment, the second light source is configured to generate light having one or more wavelengths in the range between 750 nm and 1500 nm. In one example embodiment, the optical imaging device further includes an imaging sensor positioned at the image plane, while in another example embodiment, the optical imaging device also includes a photo detector positioned to receive light that is output from the pinhole. In yet another example embodiment, images formed at the imaging sensor and the photo detector are coaligned.

According to another example embodiment, the optical imaging device includes a dichroic mirror positioned to receive the light having the first polarization and direct the light having the first polarization toward the objective lens. The dichroic mirror is positioned to also receive the scattered light from the objective lens and direct the scattered light toward the polarizing beam splitter. In this example embodiment the optical imaging device also includes a collimation lens positioned to receive light from a second light source, and a beam splitter positioned to receive light that is output from the collimation lens and to direct the light that is output from the collimation lens toward a first grating. The first grating is positioned to receive, from the beam splitter, the light that is output from the collimation lens and to direct spectrally separated light to the dichroic mirror. Further, the dichroic mirror is positioned to receive the spectrally separated light and to direct the spectrally separated light towards the objective lens for illuminating the sample. The objective lens positioned to also receive light reflected from the sample after passing of the reflected light through the immersion medium and to direct the reflected light toward the beam splitter along an optical path through the dichroic mirror and the first grating. Additionally, the beam splitter is positioned to also receive the reflected light that is directed thereto from the grating. In this example embodiment, a second focusing lens is positioned to receive light that is directed thereto from the beam splitter and to direct the light that is received thereon to a second collimation lens after passing through a slit. Furthermore, a second grating is positioned to receive light that is output from the second collimation lens and to direct at least a portion of light that incident thereon to a third focusing lens for producing a focused spectrally separated light at a second image plane.

In one example embodiment, the optical imaging device further includes an imaging sensor positioned at the image plane. In another example embodiment, the optical imaging device also includes a second imaging sensor positioned at the second image plane. In still another example embodiment, images formed by the imaging sensor and the second imaging sensor are coaligned. In yet another example embodiment, the second light source is a line light source.

In another example embodiment, the optical imaging device includes a dichroic mirror positioned to receive the light having the first polarization and to direct the light having the first polarization toward the objective lens. The dichroic mirror is positioned to also receive the scattered light from the objective lens and to direct the scattered light toward the polarizing beam splitter. In this example embodiment, the optical imaging device also includes a collimation lens positioned to receive light from a second light source, a first grating positioned to receive, on a first part of the first grating, light that is output from the collimation lens and to direct spectrally separated light toward the dichroic mirror. Further, the dichroic mirror is positioned to direct at least a portion of the spectrally separated light towards the objective lens for illuminating the sample. The objective lens is positioned to also receive reflected light from the sample after passing through the immersion medium and to direct the reflected light toward a mirror along an optical path through the dichroic mirror and a second part of the first grating that is different from the first part. The mirror is positioned to direct the light received thereon towards a second grating along an optical path that traverses through a second focusing lens, a slit and a second collimation lens. In this example embodiment, a second grating is positioned to receive light from the second collimation lens and to direct at least a portion of light that is incident thereon toward a third focusing lens for producing focused spectrally separated light at a second image plane. According to one example embodiment, the optical imaging device includes an imaging sensor positioned at the image plane. In another example embodiment, a second imaging sensor is positioned at the second image plane. In still another example embodiment, images formed by the imaging sensor and the second imaging sensor are coaligned. In yet another example embodiment, the second light source is a line light source.

Another aspect of the disclosed embodiments relates to an optical imaging device that includes a condenser positioned to receive light from a light source, and a polarizer positioned to receive light that is output from the condenser and to direct light having a first polarization toward a beam splitter. The beam splitter is positioned to receive the light having the first polarization and direct light having a second polarization toward an objective lens for illuminating a sample. The optical imaging device also includes an immersion medium positioned after the objective lens, where the immersion medium is configured to, when the sample is present, contact a surface of the sample to allow the light having the second polarization to illuminate the surface of the sample after passing through the immersion medium. The objective lens is positioned to further receive scattered light from the sample after passage through the immersion medium. The immersion medium has a refractive index that is between 1.3 and 1.5 and the objective lens has a numeric aperture that is greater than 0.25. The beam splitter of the optical imaging device is positioned to also receive the scattered light from the objective lens and direct light having a third polarization toward an analyzer. The analyzer is positioned to receive the light having the third polarization and to direct light having a fourth polarization toward a focusing lens to produce focused light having the fourth polarization at an image plane.

In one example embodiment, the beam splitter is a polarizing beam splitter while in another example embodiment, the beam splitter is a non-polarizing beam splitter. According to one example embodiment, the second polarization is the same as the fourth polarization. In another example embodiment, the second polarization is different from the fourth polarization. In still another example embodiment, the polarizer is a rotatable polarizer. In yet another example embodiment, the polarizer is a liquid crystal polarization rotator.

Various information and data processing operations described herein may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. While operations are depicted in the drawings in a particular order, this should not be understood as requiring that such operations be performed in the particular order shown or in sequential order, or that all illustrated operations be performed, to achieve desirable results. The features of the embodiments described herein may be combined in all possible combinations of methods, apparatus, modules, and systems.

What is claimed is:

1. An optical imaging device, comprising:

a condenser positioned to receive light from a light source and send the light toward a polarizing beam splitter;

the polarizing beam splitter positioned to receive at least a portion of light that is output from the condenser, and direct light having a first polarization toward an objective lens for illuminating a sample; and an immersion medium positioned after the objective lens, wherein the immersion medium is configured to, when the sample is present, contact a surface of the sample, allow the light having the first polarization to illuminate the surface of the sample after passing through the immersion medium, the objective lens positioned to further receive scattered light from the sample after passing of the scattered light through the immersion medium, wherein the immersion medium has a refractive index that is between 1.3 and 1.5 and the objective lens has a numeric aperture that is greater than 0.25;

the polarizing beam splitter positioned to also receive the scattered light from the objective lens and send light having a second polarization toward a focusing lens, and the focusing lens positioned to receive the light having the second polarization and direct focused light having the second polarization to an image plane, wherein:

the optical imaging device further comprises:

a dichroic mirror positioned to receive the light having the first polarization and direct the light having the first polarization toward the objective lens, the dichroic mirror positioned to also receive the scattered light from the objective lens and direct the scattered light toward the polarizing beam splitter;

a collimation lens positioned to receive light from a second light source; and a beam splitter positioned to receive light that is output from the collimation lens and direct the received light that is output from the collimation lens toward a beam scanner;

the beam scanner positioned to receive light from the beam splitter and direct scanned light toward the dichroic mirror, the dichroic mirror positioned to also receive the scanned light and direct the scanned light towards the objective lens, the objective lens positioned to also receive the scanned light that is directed to the objective lens by the dichroic mirror and direct the scanned light toward the sample for illuminating the sample, the objective lens positioned to also receive reflected light from the sample after the reflected light passes through the immersion medium and direct the reflected light toward a second focusing lens along an optical path through the dichroic mirror, the beam scanner and the beam splitter, and the second focusing lens positioned to focus the light that is incident thereon onto a pinhole to enable producing an image at a focal plane of the second focusing lens.

2. The optical imaging device of claim 1, wherein the light source is configured to produce light having a first spectral content and the second light source is configured to produce light having a second spectral content that is different from the first spectral content.

3. The optical imaging device of claim 1, wherein the light source is configured to generate light having one or more wavelengths in the range between 400 nm and 700 nm, and the second light source is configured to generate light having one or more wavelengths in the range between 750 nm and 1500 nm.

4. The optical imaging device of claim 1, further including an imaging sensor positioned at the image plane, the optical imaging device further includes a photo detector positioned to receive light that is output from the pinhole and images formed at the imaging sensor and the photo detector are coaligned.

5. The optical imaging device of claim 1, further comprising a processor coupled to a translation stage, the processor configured to cause the translation stage to move, wherein the objective lens is coupled to the translation stage configured to impart translational movements to the objective lens.

6. The optical imaging device of claim 1, further including an imaging sensor positioned at the image plane, the imaging sensor is an imaging sensor of a camera of a mobile device, and the focusing lens is a focusing lens of the camera of the mobile device.

7. The optical imaging device of claim 1, wherein the light source is one of a laser or a light emitting diode (LED).

8. An optical imaging device, comprising:

a condenser positioned to receive light from a light source and send the light toward a polarizing beam splitter;

the polarizing beam splitter positioned to receive at least a portion of light that is output from the condenser, and direct light having a first polarization toward an objective lens for illuminating a sample; and an immersion medium positioned after the objective lens, wherein the immersion medium is configured to, when the sample is present, contact a surface of the sample, allow the light having the first polarization to illuminate the surface of the sample after passing through the immersion medium, the objective lens positioned to further receive scattered light from the sample after passing of the scattered light through the immersion medium, wherein the immersion medium has a refractive index that is between 1.3 and 1.5 and the objective lens has a numeric aperture that is greater than 0.25;

the polarizing beam splitter positioned to also receive the scattered light from the objective lens and send light having a second polarization toward a focusing lens, and the focusing lens positioned to receive the light having the second polarization and direct focused light having the second polarization to an image plane, wherein:

the optical imaging device further comprises:

a dichroic mirror positioned to receive the light having the first polarization and direct the light having the first polarization toward the objective lens, the dichroic mirror positioned to also receive the scattered light from the objective lens and direct the scattered light toward the polarizing beam splitter;

a collimation lens positioned to receive light from a second light source;

a beam splitter positioned to receive light that is output from the collimation lens and direct the light that is output from the collimation lens toward a first grating;

the first grating positioned to receive, from the beam splitter, the light that is output from the collimation lens and direct spectrally separated light to the dichroic mirror;

the dichroic mirror positioned to receive the spectrally separated light and direct the spectrally separated light towards the objective lens for illuminating the sample;

the objective lens positioned to also receive light reflected from the sample after passing of the reflected light through the immersion medium and direct the reflected light toward the beam splitter along an optical path through the dichroic mirror and the first grating;

the beam splitter positioned to also receive the reflected light that is directed thereto from the grating;

a second focusing lens positioned to receive light that is directed thereto from the beam splitter and direct the light that is received thereon to a second collimation lens after passing through a slit; and a second grating positioned to receive light that is output from the second collimation lens and to direct at least a portion of light that incident thereon to a third focusing lens for producing a focused spectrally separated light at a second image plane.

9. The optical imaging device of claim 8, further including an imaging sensor positioned at the image plane and a second imaging sensor positioned at the second image plane, wherein images formed by the imaging sensor and the second imaging sensor are coaligned.

10. The optical imaging device of claim 8, further including an imaging sensor positioned at the image plane, the imaging sensor is an imaging sensor of a camera of a mobile device, and the focusing lens is a focusing lens of the camera of the mobile device.

11. The optical imaging device of claim 8, wherein the second light source is a line light source.

12. An optical imaging device, comprising:

a condenser positioned to receive light from a light source and send the light toward a polarizing beam splitter;

the polarizing beam splitter positioned to receive at least a portion of light that is output from the condenser, and direct light having a first polarization toward an objective lens for illuminating a sample; and an immersion medium positioned after the objective lens, wherein the immersion medium is configured to, when the sample is present, contact a surface of the sample, allow the light having the first polarization to illuminate the surface of the sample after passing through the immersion medium, the objective lens positioned to further receive scattered light from the sample after passing of the scattered light through the immersion medium, wherein the immersion medium has a refractive index that is between 1.3 and 1.5 and the objective lens has a numeric aperture that is greater than 0.25;

the polarizing beam splitter positioned to also receive the scattered light from the objective lens and send light having a second polarization toward a focusing lens, and the focusing lens positioned to receive the light having the second polarization and direct focused light having the second polarization to an image plane, wherein:

the optical imaging device further comprises:

a dichroic mirror positioned to receive the light having the first polarization and direct the light having the first polarization toward the objective lens, the dichroic mirror positioned to also receive the scattered light from the objective lens and direct the scattered light toward the polarizing beam splitter;

a collimation lens positioned to receive light from a second light source;

a first grating positioned to receive, on a first part of the first grating, light that is output from the collimation lens and direct spectrally separated light toward the dichroic mirror;

the dichroic mirror positioned to direct at least a portion of the spectrally separated light towards the objective lens for illuminating the sample;

the objective lens positioned to also receive reflected light from the sample after passing through the immersion medium and direct the reflected light toward a mirror along an optical path through the dichroic mirror and a second part of the first grating that is different from the first part;

the mirror positioned to direct the light received thereon towards a second grating along an optical path that traverses through a second focusing lens, a slit and a second collimation lens;

a second grating positioned to receive light from the second collimation lens and to direct at least a portion of light that is incident thereon toward a third focusing lens for producing focused spectrally separated light at a second image plane.

13. The optical imaging device of claim 12, further including an imaging sensor positioned at the image plane and a second imaging sensor positioned at the second image plane, wherein images formed by the imaging sensor and the second imaging sensor are coaligned.

14. The optical imaging device of claim 12, further including an imaging sensor positioned at the image plane, the imaging sensor is an imaging sensor of a camera of a mobile device, and the focusing lens is a focusing lens of the camera of the mobile device.

15. The optical imaging device of claim 12, wherein the second light source is a line light source.

* * * * *